(12) United States Patent
Harik et al.

(10) Patent No.: US 8,619,978 B2
(45) Date of Patent: Dec. 31, 2013

(54) MULTIPLE ACCOUNT AUTHENTICATION

(75) Inventors: Ralph Harik, Palo Alto, CA (US);
Georges Harik, Palo Alto, CA (US);
Praveen Krishnamurthy, Mountain View, CA (US)

(73) Assignee: PageBites, Inc., Palo Alto, CA (US)

( * ) Notice: Subject to any disclaimer, the term of this patent is extended or adjusted under 35 U.S.C. 154(b) by 1466 days.

(21) Appl. No.: 11/963,543

(22) Filed: Dec. 21, 2007

(65) Prior Publication Data

US 2008/0155669 A1    Jun. 26, 2008

Related U.S. Application Data

(60) Provisional application No. 60/871,754, filed on Dec. 22, 2006.

(51) Int. Cl.
G06F 21/00    (2013.01)
(52) U.S. Cl.
USPC ........ 380/44; 726/5; 726/6; 726/27; 713/176; 713/182; 709/217; 455/411; 705/35; 380/30; 380/277
(58) Field of Classification Search
USPC ........................................ 726/6; 380/277, 44
See application file for complete search history.

(56) References Cited

U.S. PATENT DOCUMENTS

| | | | |
|---|---|---|---|
| 6,971,005 B1 * | 11/2005 | Henry et al. | 713/155 |
| 7,083,089 B2 * | 8/2006 | Hopkins | 235/382 |
| 7,152,693 B2 * | 12/2006 | Man et al. | 173/183 |
| 7,788,709 B1 * | 8/2010 | Henry et al. | 726/6 |
| 7,818,396 B2 * | 10/2010 | Dolin et al. | 709/217 |
| 2001/0007129 A1 * | 7/2001 | Bendel et al. | 713/172 |
| 2003/0185398 A1 * | 10/2003 | Hypponnen | 380/277 |
| 2005/0097348 A1 * | 5/2005 | Jakubowski et al. | 713/200 |
| 2005/0251866 A1 * | 11/2005 | Kobayashi et al. | 726/27 |
| 2006/0064463 A1 * | 3/2006 | Chan et al. | 709/206 |
| 2006/0126848 A1 * | 6/2006 | Park et al. | 380/277 |
| 2006/0190736 A1 * | 8/2006 | John et al. | 713/182 |
| 2006/0242415 A1 * | 10/2006 | Gaylor | 713/176 |
| 2007/0033174 A1 * | 2/2007 | Cornacchia, III | 707/3 |
| 2008/0046349 A1 * | 2/2008 | Elberg et al. | 705/35 |

OTHER PUBLICATIONS

Henry et al, "A common password method for protection of multiple accounts", Publication Date: 2003, 2749-54 vol. 3,14th IEEE 2003 International Symposium on Personal, Indoor and Mobile Radio Communications. Proceedings (IEEE Cat. No. 03TH8677).*

* cited by examiner

Primary Examiner — Morshed Mehedi
(74) Attorney, Agent, or Firm — Edward C. Kwok; Hogan Lovells US LLP

(57) ABSTRACT

A method and a system allow accessing several of a user's controlled access accounts by presenting the credentials of only one of the accounts. The method may include (a) storing the credentials for each of the user's accounts; (b) receiving from the user credentials corresponding to any of the user's accounts; (c) presenting the received credentials to access the corresponding account; and (d) upon successful access of the corresponding account, using the stored credentials to access one or more of the user's accounts without requiring the user to present the corresponding credentials. For each of the user's accounts, the credentials are stored encrypted, using a randomly generated key, common to all the encrypted credentials. In addition, the randomly generated key is encrypted using the credentials of each of the accounts. In that manner, plain-text copies of neither the random key nor the credentials of the accounts need to be stored.

11 Claims, 4 Drawing Sheets ically generated symmetric encryption key, common to all the encrypted credentials. In addition, the randomly generated symmetric encryption key (henceforth referred to as the random key) is encrypted using the credentials of each of the accounts using a symmetric encryption. In that manner, plain-text copies of neither the random key nor the credentials of the accounts need to be stored.

MULTIPLE ACCOUNT AUTHENTICATION

CROSS REFERENCE TO RELATED APPLICATIONS

The present application claims priority of U.S. provisional patent application No. 60/871,754, filed Dec. 22, 2006, incorporated herein by reference.

BACKGROUND OF THE INVENTION

1. Field of the Invention

The present invention relates to a user-friendly interface design. In particular, the present invention allows a user having access to multiple selected accounts to be authenticated for all such accounts in a simple and secure manner.

2. Discussion of the Related Art

There is a proliferation of accounts with restricted access for users of the Internet. For example, many users of instant messaging have multiple accounts at the large networks or providers, such as Google Talk, AOL, MSN, Yahoo, Skype and others. Increasingly, it is a burden for a user to both remember all his or her usernames and passwords, as well as to actually sign into all of his or her accounts. One solution is to create a new system that signs onto all of a user's accounts simultaneously. A typical implementation of such a system requires that the user create a new account with new credentials, and then associate the credentials for each of the other accounts with this new account. However, this can be onerous for the user—often forcing him or her to remember yet another new account username and password.

SUMMARY

According to one embodiment of the present invention, a method and a system allowing access to several of a user's controlled access accounts by presenting the credentials of only one of the accounts. The method may include (a) storing the credentials for each of the user's accounts; (b) receiving from the user credentials corresponding to any of the user's accounts; (c) presenting the received credentials to access the corresponding account; and (d) upon successful access of the corresponding account, using the stored credentials to access one or more of the user's accounts without requiring the user to present the corresponding credentials. In a secure embodiment, for each of the user's accounts, the credentials are stored encrypted, using a randomly generated symmetric encryption key, common to all the encrypted credentials. In addition, the randomly generated symmetric encryption key (henceforth referred to as the random key) is encrypted using the credentials of each of the accounts using a symmetric encryption. In that manner, plain-text copies of neither the random key nor the credentials of the accounts need to be stored.

According to one embodiment of the present invention, to access the accounts, the user presents the credentials to access any one of the accounts. Upon successful access (thus authenticating the user), the method retrieves the stored encrypted random key, and decrypts it to recover the random key itself. The random key is then used to recover from the corresponding encrypted credentials the credentials to each account to be accessed. These recovered credentials are then used to access the remaining accounts. The random key may be generated at the time of storing the first set of credentials for the user's accounts.

According to one embodiment of the present invention, a system for accessing a user's multiple accounts requiring presentation of credentials may include (a) a random key generator that generates a random key for the user; (b) a credential record for each account holding the credentials required for that account encrypted using a symmetric key encryption algorithm such as DES, IDEA, Blowfish, AES, or other techniques known to those skilled in the art; (c) a key record for each account holding the random key encrypted using the credentials corresponding to that account again using a symmetric encryption method corresponding to that above; and (d) decryption means for recovering the credentials for any of the accounts from the corresponding credential record using the random key, and for recovering the random key using the credentials of any of the accounts from the corresponding key record.

The present invention is better understood upon consideration of the detailed description below and the accompanying drawings.

DETAILED DESCRIPTION OF THE PREFERRED EMBODIMENTS

Figure 1:
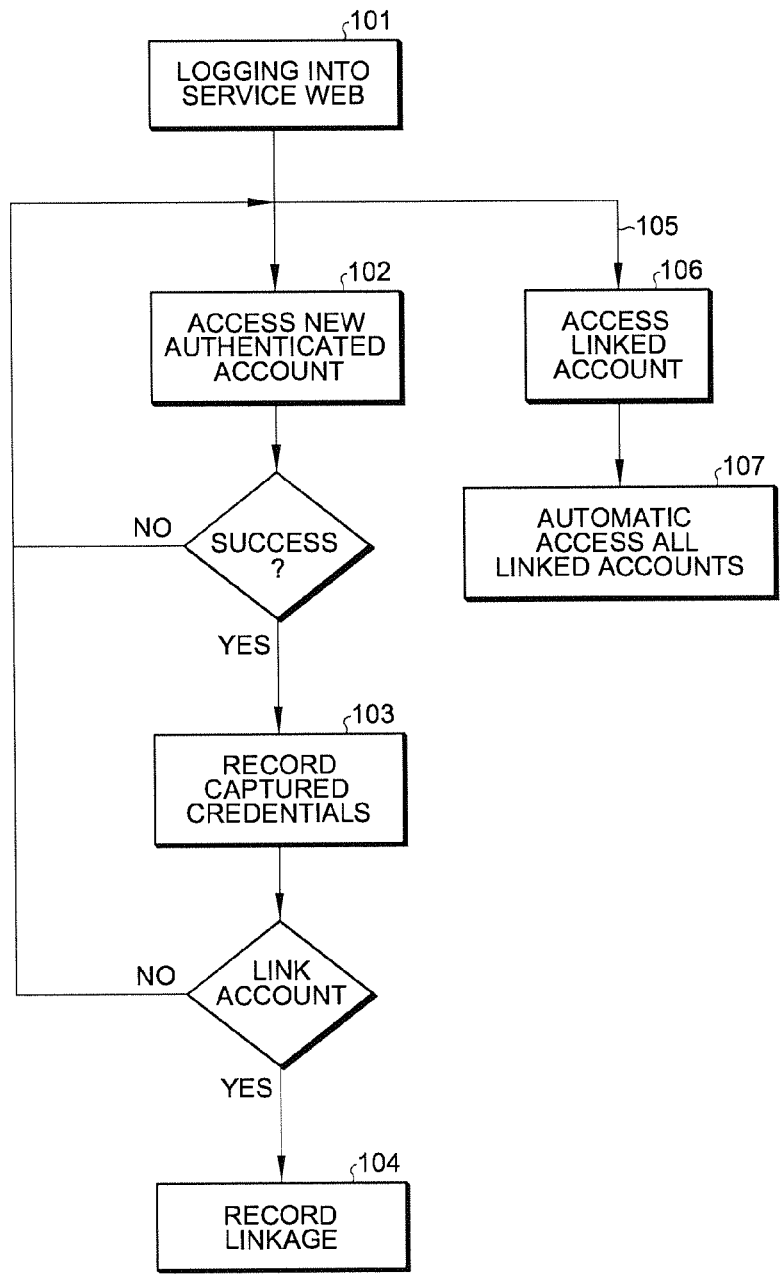
FIG. 1 illustrates a service provided on a website for linking authenticated accounts in various networks or systems, in accordance with one embodiment of the present invention.

According to one embodiment of the invention, a method links multiple authenticated accounts in various systems or networks to allow a user access to these accounts simultaneously by supplying a single set of credentials associated with any one of the accounts. For example, a user may have a number of accounts each associated with a different set of username and password ("credentials") on different information systems. According to the present invention, illustrated by FIG. 1, a service ("EasyLogin") may be provided on a website to allow a registered user of the website to link these accounts together. Under EasyLogin, the user supplies only the credentials of any one of the existing accounts on a first network, and EasyLogin then gains access for the user to all of the user's accounts on the other networks. As illustrated in FIG. 1, after properly logging into the website (step 101), the user may then access any of the various authenticated accounts by presenting the corresponding proper credentials (step 102), e.g., presenting the username and password. When the system or network corresponding to the accessed account accepts the credential presented, the credentials are captured and recorded by the website (step 103). The website then presents the user the option to link the account with other linked accounts (step 104). On a subsequent visit to the website (step 105), when the user supplies credentials to any one of the systems and gains access (step 106), the website accesses its records for the user's credentials for accounts in the other systems or networks, and gains access to these other accounts on the user's behalf (step 107).

Thus, the present invention provides a simpler solution, in which the user can access any of the above systems using only an existing username and password, and without creating any new username or password. The user's enjoyment of the networks is enhanced, as access to his or her multiple accounts is achieved using only an existing username and password, without requiring creation of any new username or password.

According to one embodiment of the present invention, referred to as "credential self-encryption," security is further improved for a user on the Internet. Using credential self-encryption, the user's actual credentials to the systems are not stored. Rather, a method is stored which is capable of recreating the credentials for all the systems, given the credentials of any one of the systems. For a simplistic example to illustrate the principles of credential self-encryption, suppose a user's credentials in each system is represented by a number. Furthermore, suppose the user has accounts on two systems, with credentials A and B, respectively. According to the present invention, the system may store the arithmetic sum A+B, rather than the user's actual individual credentials A and B. Subsequently, when one of the user's credentials (e.g., A) is presented and verified, the system derives the other credentials by subtracting A from the stored arithmetic sum A+B to recover the other credentials B. In this manner, even if a hostile party obtains access to the stored information (i.e., the arithmetic sum A+B), security is not compromised, as the individual credentials A and B cannot be easily recovered without specific knowledge of the nature of the stored value and actual knowledge of at least one of the credentials. Of course, this simplistic example is for illustrative purpose only and too simplistic for practical use, and can be used only with two systems that are associated with simple credentials.

Figure 2:
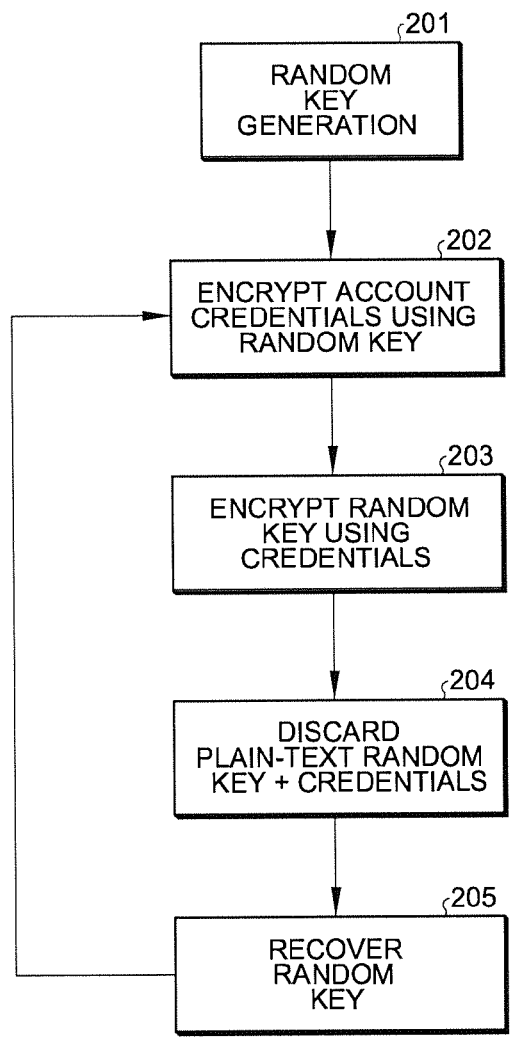
FIG. 2 illustrates a method for providing the service of FIG. 1 under improved security, according to one embodiment of the present invention.
Figure 4:
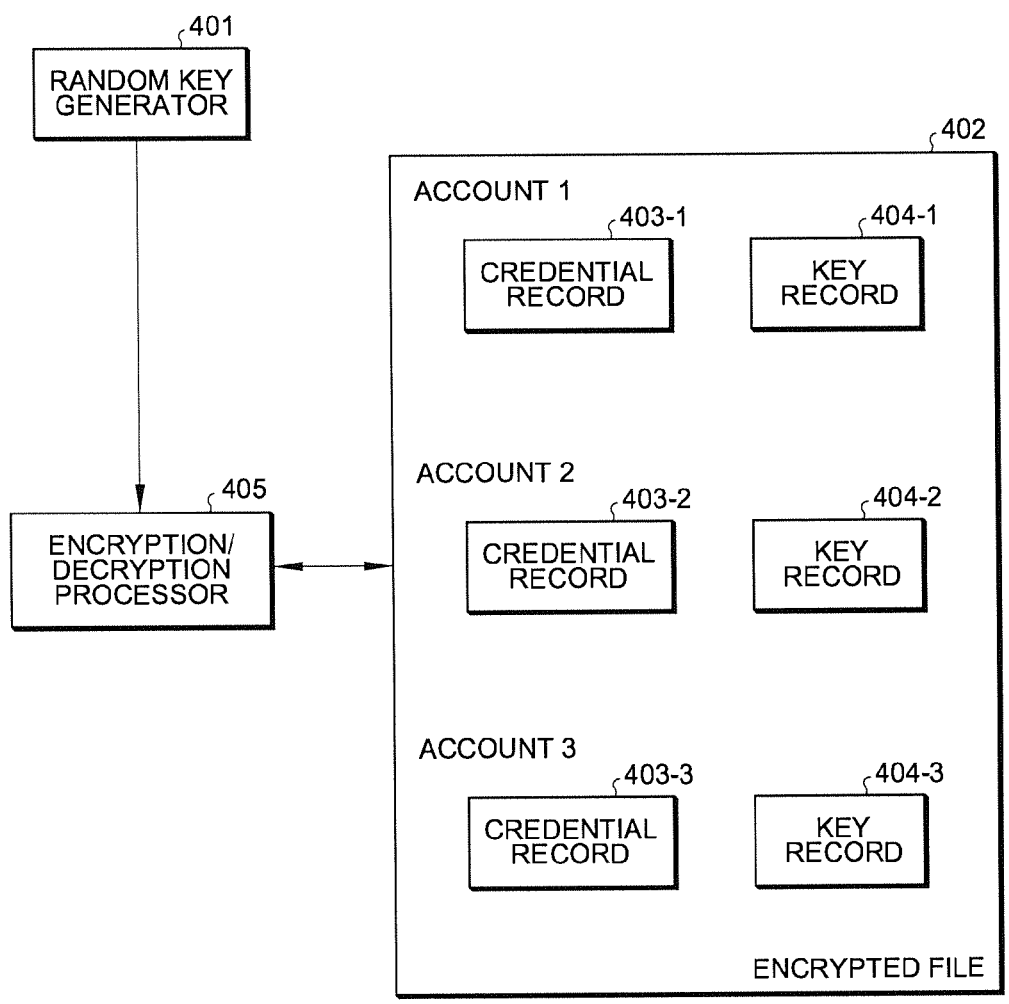
FIG. 4 is an exemplary system 400 for supporting the operations of FIG. 2.

FIG. 2 illustrates one practical implementation for credential self-encryption, according to one embodiment of the present invention. FIG. 4 shows exemplary system 400 capable of supporting the operations of FIG. 2. As shown in FIGS. 2 and 4, system 400 includes a random key generator 401 which generates a random key (i.e., a randomly generated key which value is kept secret) for the user prior to the user linking the first account (step 201). This random key is used subsequently by encryption/decryption processor 405 to encrypt all of user's credentials for all accounts (step 202; including the first account to be linked), creating stored "encrypted credentials". The encrypted credentials are stored in an encrypted record (e.g., encrypted credentials record 403-1) in an encrypted file (e.g., encrypted file 402). To avoid discovery of this random key, system 400 encrypts the random key with the credentials of the first account (step 203), creating the first "credential-encrypted key." The credential-encrypted key may be stored in encrypted file 402 as an encrypted key record (e.g., encrypted key record 404-1) and then discards the random secret key (step 204). Any suitable symmetric key encryption method may be used, including AES, Blowfish, and DES known to those skilled in the art. To link an additional account, the random secret key is recovered using any of the user's credentials to previously linked accounts (step 205). The recovered random secret key is then used to encrypt the credentials to the additional account to be linked (returning to step 202). System 400 stores the encrypted credentials thus created (e.g., encrypted credentials record 403-2 in encrypted file 402). At the same time, the new credentials are used to encrypt the random key to create the credential-encrypted key associated with the new credentials (step 203; encrypted key record 404-2). All plain-text copies of the recovered random key is then destroyed. The user may, at any time, delink any one or more of the accounts. Delinking is accomplished by destroying the record or records holding the corresponding encrypted credentials and the corresponding credential encrypted key. The encryption schemes used for creating the credential encrypted key and for creating the encrypted credentials need not be the same.

Figure 3:
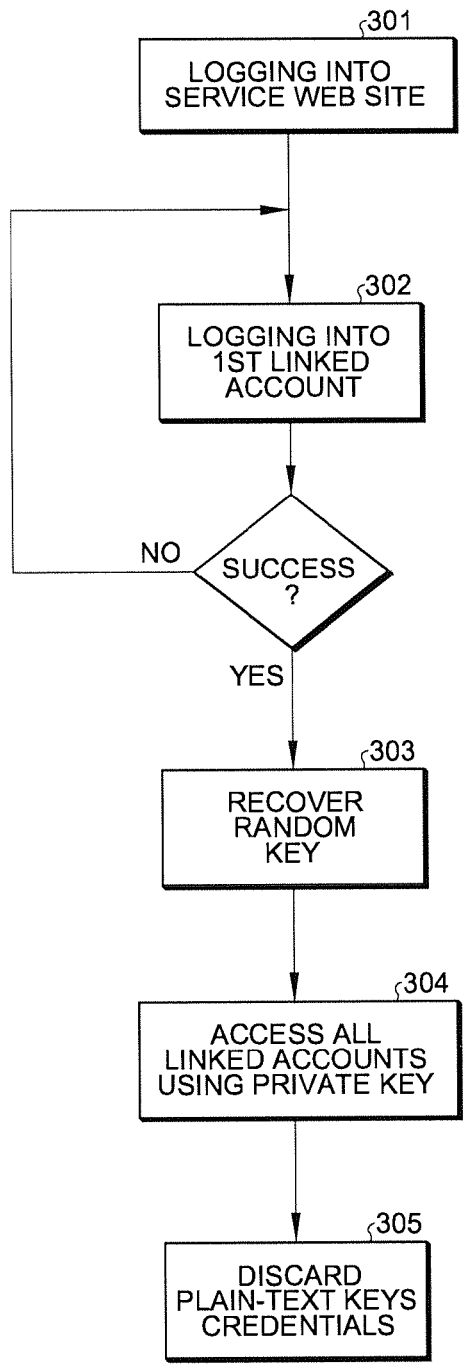
FIG. 3 illustrates gaining access to all of the user's linked account using the service of FIG. 1, in accordance to one embodiment of the present invention.

FIG. 3 illustrates gaining access to all of the user's linked account using the service of FIG. 1, in accordance to one embodiment of the present invention. At a later time, when the user logs into the website (step 301), the user activates the service to access one of the linked accounts by providing the credentials for that account (step 302). Upon acceptance by the system or network for that account, the website retrieves the corresponding credential encrypted key to recover the random key (step 303). The recovered random key is then used to decrypt each set of encrypted credentials to recover the plain-text credentials, which are then used to access the corresponding service or network (step 304). All copies of the recovered random key and plain-text credentials are then destroyed (step 305).

Under this system, neither the random key nor any one the actual credentials may be obtained or retrieved merely from the stored information. However, given the credentials for any one system, the random key can be recovered, and using the recovered random key, all the other actual credentials can be retrieved. Such a method makes the storage of the user's credentials more secure than a method in which the credential data is stored in plaintext, or even encrypted with a key that is at all times known to the implementers of a multiple login system.

This invention can be implemented using any authentication system, online or offline. It can be used to consolidate email addresses, bank and financial accounts, multiple calendaring systems or social networks, and indeed any information system that is accessed by presenting required credentials.

The above detailed description is provided to illustrate the specific embodiments of the present invention and is not intended to be limiting of the present invention. Numerous modifications and variations within the scope of the present invention are possible. The present invention is set forth in the following claims.

We claim:

1. A computer-implemented method for accessing a user's plurality of accounts requiring presentation of credentials, comprising:
    generating a random key;
    using the random key, encrypting the credentials of each of the user's accounts;
    creating a key record for each of the user's accounts, each key record being the random key encrypted by the credentials associated with the corresponding account;
    for each of the user's accounts, storing the corresponding key record and the corresponding encrypted credentials;
    destroying plain-text copies of the random key, and plain-text copies of all credentials;
    receiving from the user credentials corresponding to any one of the user's accounts;
    presenting the received credentials to access the corresponding account; and
    upon successful access of the corresponding account, using the received credentials to recover the random key from the corresponding key record, using the recovered random key to decrypt the stored encrypted credentials of one or more of the user's other accounts, and using the decrypted credentials to access the one or more of the user's other accounts without requiring the user to present the corresponding credentials.

2. A method as in claim 1, further comprising destroying all copies of the recovered credentials and the recovered random key.

3. A method as in claim 1, wherein the random key is encrypted using any symmetric key encryption algorithm selected from the group consisting of DES, IDEA, Blowfish, and AES.

4. A method as in claim 1, wherein the random key is generated at the time of storing the first set of credentials for the user's accounts.

5. A method as in claim 1, wherein encrypting the credentials and encrypting the random key use different encryption schemes.

6. A system for accessing a user's multiple accounts requiring presentation of credentials, comprising:
- a random key generator that generates a random key for the user;
- a credential record for each account, the credential record holding the credentials required for that account encrypted using the random key;
- a key record for each account, the key record holding the random key encrypted using the credentials corresponding to that account; and
- decryption means for recovering the credentials for any one of the accounts from the corresponding credential record using the random key, and for recovering the random key using the credentials of any one of the accounts from the corresponding key record,
- wherein (i) the random key is generated only for one of the accounts,
- (ii) the credential record and the key record for each of the other ones of the accounts are created by recovering the random key from the credential records, and
- (iii) the plain-text copies of the random key are destroyed after the first one of the key records are created.

7. A system as in claim 6, further comprising a user interface for receiving from the user credentials for any of the accounts.

8. A system as in claim 7, wherein the user interface is provided in the form of a web page.

9. A system as in claim 7, further comprising accessing means for presenting the received credentials to obtain access to the corresponding account.

10. A system as in claim 7, further comprising a record generator that creates the credential record from the received credentials.

11. A system as in claim 6, wherein the credential record and the key record are created using different encryption schemes.

\* \* \* \* \*